United States Patent
Vannithamby et al.

(10) Patent No.: US 9,867,140 B2
(45) Date of Patent: *Jan. 9, 2018

(54) RANDOM ACCESS TECHNIQUES FOR FIXED DEVICES IN MOBILE BROADBAND NETWORKS

(71) Applicant: Intel Corporation, Santa Clara, CA (US)

(72) Inventors: Rath Vannithamby, Portland, OR (US); Jing Zhu, Portland, OR (US); Ali T Koc, Portland, OR (US); Maruti Gupta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/943,705

(22) Filed: Nov. 17, 2015

(65) Prior Publication Data

US 2016/0192298 A1 Jun. 30, 2016

Related U.S. Application Data

(63) Continuation of application No. 13/995,035, filed as application No. PCT/US2011/062659 on Dec. 1, 2011, now Pat. No. 9,215,647.

(Continued)

(51) Int. Cl.
*H04W 52/24* (2009.01)
*H04B 7/0456* (2017.01)
(Continued)

(52) U.S. Cl.
CPC ........ *H04W 52/241* (2013.01); *H04B 7/0456* (2013.01); *H04B 7/0486* (2013.01);
(Continued)

(58) Field of Classification Search
CPC ............... H04W 52/241; H04W 52/50; H04W 52/0216; H04W 4/005; H04W 72/042;
(Continued)

(56) References Cited

U.S. PATENT DOCUMENTS 9,215,647 B2 * 12/2015 Vannithamby ....... H04B 7/0486
9,642,021 B2 * 5/2017 Siomina ................ H04W 24/00
(Continued)

FOREIGN PATENT DOCUMENTS

CN  1689247 A  10/2005
CN  101600246 A  12/2009
(Continued)

OTHER PUBLICATIONS

Office Action received for Chinese Patent Application No. 201180070555.8, dated Oct. 21, 2016, 15 pages including 9 pages of English translation.
(Continued)

*Primary Examiner* — Afsar M Qureshi
(74) *Attorney, Agent, or Firm* — Alpine Technology Law Group LLC

(57) ABSTRACT

Briefly, in accordance with one or more embodiments, a fixed device performs a cell search to search for one or more cells on a network and determines a transmit power level to communicate with one of the cells of the network. The fixed device sets a frequency of updating the transmit power level for communication with a cell on the network, wherein the frequency of updating the transmit power level is reduced for the fixed device with respect to a mobile device.

19 Claims, 8 Drawing Sheets

Related U.S. Application Data

(60) Provisional application No. 61/471,042, filed on Apr. 1, 2011.

(51) Int. Cl.

| | |
|---|---|
| *H04L 5/00* | (2006.01) |
| *H04L 25/02* | (2006.01) |
| *H04L 12/26* | (2006.01) |
| *H04L 12/721* | (2013.01) |
| *H04L 29/06* | (2006.01) |
| *H04W 4/00* | (2009.01) |
| *H04W 24/00* | (2009.01) |
| *H04W 24/02* | (2009.01) |
| *H04W 24/10* | (2009.01) |
| *H04W 28/08* | (2009.01) |
| *H04W 48/10* | (2009.01) |
| *H04W 48/12* | (2009.01) |
| *H04W 52/02* | (2009.01) |
| *H04W 52/14* | (2009.01) |
| *H04W 52/18* | (2009.01) |
| *H04W 72/04* | (2009.01) |
| *H04W 52/28* | (2009.01) |
| *H04W 52/50* | (2009.01) |
| *H04B 7/04* | (2017.01) |
| *H04B 7/06* | (2006.01) |
| *H04J 11/00* | (2006.01) |
| *H04L 25/03* | (2006.01) |
| *H04W 28/04* | (2009.01) |
| *H04W 72/00* | (2009.01) |
| *H04W 88/02* | (2009.01) |
| *H04W 88/08* | (2009.01) |
| *H04W 92/20* | (2009.01) |
| *H04W 74/08* | (2009.01) |

(52) U.S. Cl.
CPC ......... *H04B 7/0632* (2013.01); *H04B 7/0639* (2013.01); *H04J 11/0073* (2013.01); *H04L 5/003* (2013.01); *H04L 5/0037* (2013.01); *H04L 5/0094* (2013.01); *H04L 25/0206* (2013.01); *H04L 25/0226* (2013.01); *H04L 25/03343* (2013.01); *H04L 43/50* (2013.01); *H04L 45/70* (2013.01); *H04L 65/608* (2013.01); *H04W 4/005* (2013.01); *H04W 24/00* (2013.01); *H04W 24/02* (2013.01); *H04W 24/10* (2013.01); *H04W 28/08* (2013.01); *H04W 48/10* (2013.01); *H04W 48/12* (2013.01); *H04W 52/0216* (2013.01); *H04W 52/146* (2013.01); *H04W 52/18* (2013.01); *H04W 52/282* (2013.01); *H04W 52/50* (2013.01); *H04W 72/042* (2013.01); *H04W 72/0413* (2013.01); *H04W 72/0453* (2013.01); *H04L 5/005* (2013.01); *H04L 25/0328* (2013.01); *H04L 2025/03426* (2013.01); *H04L 2025/03802* (2013.01); *H04W 28/048* (2013.01); *H04W 72/00* (2013.01); *H04W 74/0833* (2013.01); *H04W 88/02* (2013.01); *H04W 88/08* (2013.01); *H04W 92/20* (2013.01); *Y02B 60/50* (2013.01)

(58) Field of Classification Search
CPC ......... H04W 72/0453; H04W 72/0413; H04W 24/00; H04W 24/02; H04W 48/12; H04W 92/20; H04W 28/048; H04W 88/02; H04W 74/0833; H04L 5/003; H04L 45/70; H04L 25/03343; H04L 25/0226; H04L 25/0328; H04J 11/003; H04B 7/0486; H04B 7/0639
USPC .......................................................... 370/252
See application file for complete search history.

(56) References Cited

U.S. PATENT DOCUMENTS

| | | | |
|---|---|---|---|
| 2003/0176203 | A1 | 9/2003 | Sih et al. |
| 2004/0002352 | A1* | 1/2004 | Sendonaris ......... H04W 52/283 455/522 |
| 2004/0219876 | A1 | 11/2004 | Baker et al. |
| 2005/0043053 | A1 | 2/2005 | Lin et al. |
| 2005/0282574 | A1* | 12/2005 | Li .................... H04W 52/06 455/522 |
| 2008/0233945 | A1 | 9/2008 | Gummadi |
| 2009/0143091 | A1 | 6/2009 | Kim et al. |
| 2009/0305736 | A1* | 12/2009 | Omori ................. H04W 52/50 455/522 |
| 2010/0323736 | A1* | 12/2010 | Fischer ............ H04W 74/0866 455/509 |
| 2010/0325506 | A1* | 12/2010 | Cai ................... H04W 72/042 714/748 |
| 2011/0085490 | A1* | 4/2011 | Schlee ................ H04B 17/102 370/315 |
| 2011/0096687 | A1 | 4/2011 | Dottling et al. |
| 2012/0057476 | A1* | 3/2012 | Chan ................... H04W 88/06 370/252 |
| 2013/0107868 | A1* | 5/2013 | Sadek ................ H04W 52/244 370/338 |
| 2013/0148517 | A1 | 6/2013 | Abraham et al. |
| 2014/0206411 | A1* | 7/2014 | Ruutu .................. H04W 64/00 455/522 |

FOREIGN PATENT DOCUMENTS

| | | |
|---|---|---|
| CN | ZL201180070555.8 | 6/2017 |
| KR | 2011-0018790 A | 2/2011 |
| WO | 2009/023740 A1 | 2/2009 |
| WO | 2012/134551 A2 | 10/2012 |
| WO | 2012/134551 A3 | 2/2013 |
| WO | 2012/134551 A9 | 5/2013 |

OTHER PUBLICATIONS

European Search Report issued in European Patent Application No. 11862275.2, dated Mar. 12, 2015, 10 pages.
International Preliminary Report on patentability and Written Opinion Received for PCT Patent Application No. PCT/US2011/062759, dated Oct. 10, 2013, 8 pages.
International Search Report and Written Opinion received for PCT Patent Application No. PCT/US2011/062759, dated Nov. 30, 2012, 10 pages.
Office Action received for Chinese Patent Application No. 2011800705558, dated Feb. 14, 2016, 20 pages including 13 pages of English translation.

* cited by examiner

RANDOM ACCESS TECHNIQUES FOR FIXED DEVICES IN MOBILE BROADBAND NETWORKS

CROSS REFERENCE TO RELATED APPLICATIONS

The present application claims the benefit of U.S. application Ser. No. 13/995,035 filed on Aug. 5, 2013 which in turns claims benefit of International Application No. PCT/US2011/062759 filed on Dec. 1, 2011 which in turn claims benefit U.S. Provisional Application No. 61/471,042 filed Apr. 1, 2011. Said application Ser. No. 13/995,035, PCT/US2011/062759, 61/471,042 are hereby incorporated herein by reference in their entirety.

BACKGROUND

Random access is utilized in broadband networks such as networks compliant with a Third Generation Partnership Project (3GPP) Long Term Evolution (LTE) standard or similar networks for the device or user equipment (UE) to get access to the network since there is no dedicated channel in LTE networks unlike in the legacy Third Generation (3G) networks. In the future, it is expected that there will be a large number (i.e., billions) of Fixed Machine-to-Machine (M2M) devices in deployment with a portion of such fixed devices having Mobile Broadband access. Random access in 3GPP LTE Release 8 and beyond (Rel. 8+) may be optimized to support mobile devices. However, for fixed devices, the randomness of communications may be reduced significantly in comparison with the randomness of mobile devices. Moreover, the access latency specifications for most fixed M2M devices may vary significantly from that for mobile devices. As a result, using the current Random Access mechanisms in 3GPP LTE Rel. 8+ may be inefficient for supporting fixed devices.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
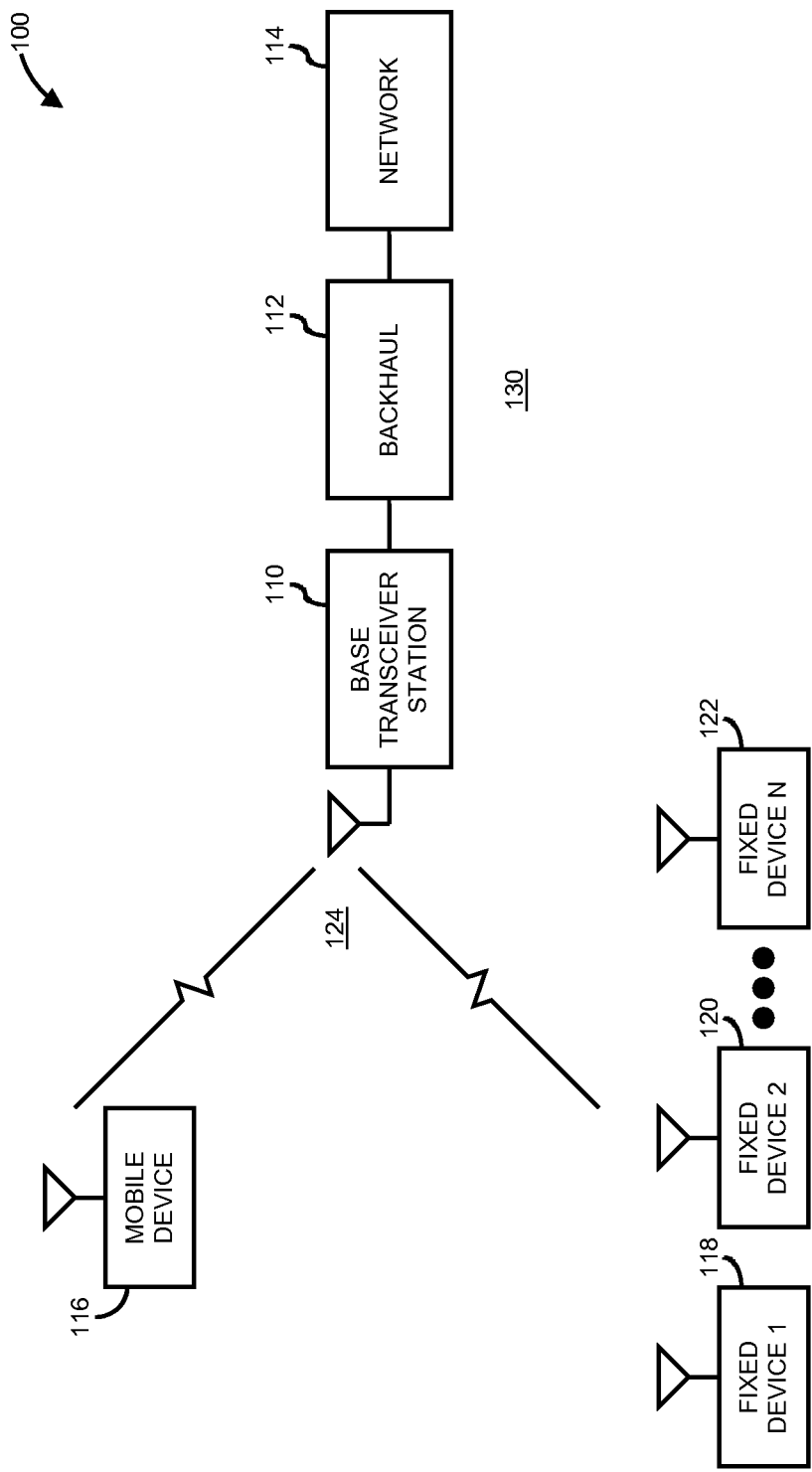
FIG. 1 is a block diagram of an example machine-to-machine (M2M) system in which fixed devices may be deployed in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of an example machine-to-machine (M2M) system in which fixed devices may be deployed in accordance with one or more embodiments will be discussed. As shown in FIG. 1, a machine-to-machine (M2M) system 100 may comprise a base transceiver station (BTS) 110 coupled to a network 114 via backhaul 112. The base transceiver station 110 may provide an air interface 124 between on or more mobile devices such as mobile device 116 and/or one or more fixed devices such as a first fixed device 118, a second fixed device 120, up to an Nth fixed device 122. The base transceiver station 110 may be deployed in a cell of a mobile broadband network such as a Long Term Evolution (LTE) network as discussed herein. The fixed devices and/or the mobile devices and the base transceiver station 110 together comprise an air interface 124, and backhaul 112 and network 114 comprise a core network 130. In some embodiments as will be discussed in further detail with respect to FIG. 2 below, M2M system 100 may comprise a mobile broadband network in accordance with a Long Term Evolution (LTE) standard wherein base transceiver station 110 comprises an enhanced Node B (eNB) and the mobile devices and fixed devices comprise user equipment (UE). Furthermore, in some embodiments network 114 may comprise the Internet. In one or more alternative embodiments, M2M system 100 may comprise any various type of broadband network such as Worldwide Interoperability for Microwave Access (WiMAX) network in accordance with an Institute for Electrical and Electronics Engineers (IEEE) standard such as an IEEE 802.16e standard, or a WiMAX-II network in accordance with an IEEE 802.16m standard. However, these are merely example implementations for M2M system 100, and the scope of the claimed subject matter is not limited in these respects.

In one or more embodiments, mobile devices such as mobile device 116 and/or fixed devices such as fixed device 118, fixed device 120 or fixed device 122 may utilize random access to communicate via M2M network. In such embodiments, M2M system 100 allows for the devices to communicate data they may have to transmit over the core network 130 to a remote device or server coupled to network 114 when such data is available. For example, field data may be gathered by the devices and sent back to a monitoring station for collection and analysis. In such an example, the fixed devices such as fixed device 118, fixed device 120, and fixed device 122 may comprise parking meters. When the parking meter is full of coins and is ready to be emptied, a given parking meter may communicate its state to a monitoring server coupled to network 114, in which case an operator may then go that parking meter and remove the coins stored therein. The parking meter may then continue to operate until it is again full and sends a subsequent signal to the monitoring server. As another example, the fixed devices may comprise vending machines such as a drink vending machine. A given machine may communicate to a remote server that a given drink is low to indicate that an operator should come to that machine and refill the low drink. In yet another example, a the fixed devices may be deployed to monitor for the presence of a specified hazardous substance such as for a chemical agent, a biological agent, and/or a radionuclide wherein the fixed device 118 includes an appropriate sensor. In the event the fixed device 118 detects the presence of the target substance, the fixed device may communicate to a remote server of the result and/or that an appropriate response should be taken. Various other types of fixed devices may be deployed in M2M system 100, and the scope of the claimed subject matter is not limited in these respects. In one or more embodiments, M2M system 100 may comprise a mobile broadband network such as an LTE network as shown in and described with respect to FIG. 2, below.

Figure 2:
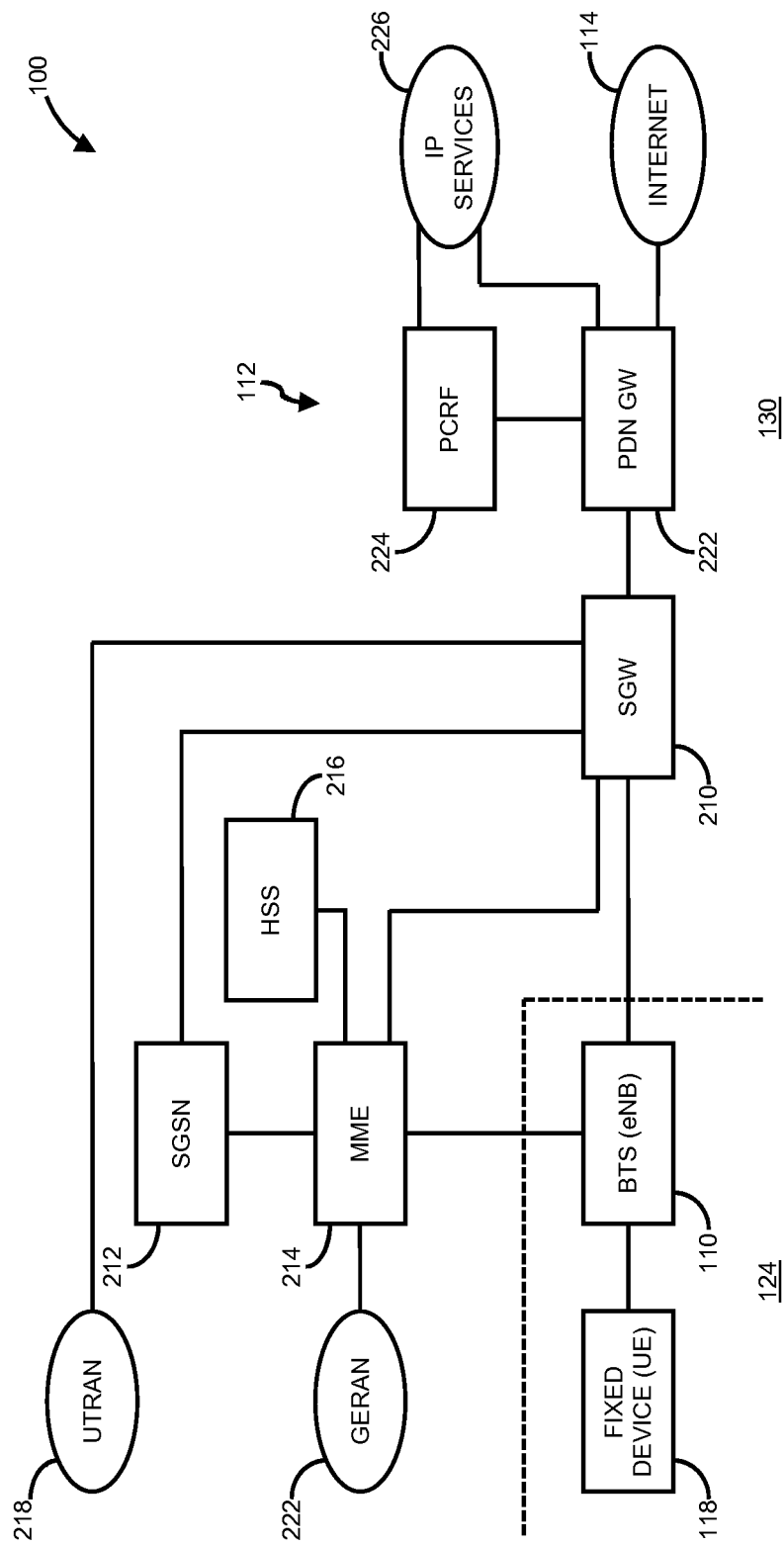
FIG. 2 is a block diagram of an example machine-to-machine (M2M) system wherein the system may include a Long Term Evolution (LTE) network or the like for broadband access in accordance with one or more embodiments.

Referring now to FIG. 2, a block diagram of an example machine-to-machine (M2M) system wherein the system may include a Long Term Evolution (LTE) network or the like for broadband access in accordance with one or more embodiments. FIG. 2 shows a block diagram of the overall architecture of machine-to-machine (M2M) system 100 comprising a Third Generation Partnership Project (3GPP) Long Term Evolution (LTE) network that includes network elements and standardized interfaces. At a high level, M2M system 100 comprises a core network (CN) 130, also referred to as an evolved Packet System (EPC), and an air-interface access network 124, also referred to as an evolved Universal Terrestrial Radio Access Network (E-UTRAN). Core network 130 is responsible for the overall control of the various User Equipment (UE), such as fixed device 118, connected to the M2M system 100 and for the establishment of the bearers. Air interface network 124 is responsible for radio-related functions in communication with base transceiver station 110, also referred to as an enhanced Node B (eNB).

The main logical nodes of core network 130 provide a backhaul 112 include a Serving General Packet Radio Service (GPRS) Support Node (SGSN) 212, Mobility Management Entity (MME) 214, a Home Subscriber Server (HSS) 216, a Serving Gateway (SGW) 210, a Packet Data Network (PDN) Gateway (PDN GW) 222, and a Policy and Charging Rules Function (PCRF) Manager 224. Serving Gateway 210 couples to Universal Terrestrial Radio Access Network (UTRAN) 218 to couple base transceiver station 110 as eNB to one or more other eNBs. Mobility Management Entity 214 couples to Global System for Mobile Communications (GSM) Enhanced Data rates for GSM Evolution (EDGE) Radio Access Network (GERAN) 222 to couple base transceiver station 110 and base station controller as interfaces to one or more other base transceiver stations. The network elements of core network 130 are interconnected by standardized interfaces to provide various network functions, and the scope of the claimed subject matter is not limited in these respects.

While core network 130 includes many logical nodes, air interface network 124 comprises base transceiver station 110 as an evolved Node B (eNB) that connects to one or more User Equipment (UE) such as fixed device 118. Although FIG. 2 shows one user equipment, multiple fixed devices and/or mobile devices may coupe with base transceiver station 110, and the scope of the claimed subject matter is not limited in this respect. For normal user traffic, as opposed to broadcast traffic, there is no centralized controller air interface, and as such the architecture of air interface 124 is referred to as flat. Multiple eNBs may be interconnected via an interface referred to as "X2" and to the evolved packet core network 130 by an S1 interface, more specifically to MME 214 by an S1 MME interface and to the SGW 210 by an S1 U interface. The protocols that run between the eNBs and the UEs are generally referred to as action script (AS) protocols.

In one or more embodiments, the base transceiver station 110 as an eNB hosts the physical (PHY), Medium Access Control (MAC), Radio Link Control (RLC), and Packet Data Control Protocol (PDCP) layers, and which include the functionality of user-plane header-compression and encryption. Base transceiver station 110 also provides Radio Resource Control (RRC) functionality corresponding to the control plane, and performs many functions including radio resource management, admission control, scheduling, enforcement of negotiated uplink (UL) quality of service (QoS), cell information broadcast, ciphering/deciphering of user and control plane data, and compression/decompression of downlink/uplink (DL/UL) user plane packet headers.

The RRC layer in base transceiver station 110 covers functions related to the radio bearers, such as radio bearer control, radio admission control, radio mobility control, scheduling and dynamic allocation of resources to UEs in both uplink and downlink, source rate and PIT adaptation, header compression for efficient use of the radio interface, security of all data sent over the radio interface, and connectivity to the evolved packet core network 130. The RRC layer makes handover decisions based on neighbor cell measurements sent by the UEs, generates pages for the UEs over the air, broadcasts system information, controls UE measurement reporting, such as the periodicity of Channel Quality Information (CQI) reports, and allocates cell-level temporary identifiers to active UEs. The RRC layer also executes transfer of UE context from a source eNB to a target eNB during handover, and provides integrity protection for RRC messages. Additionally, the RRC layer is responsible for the setting up and maintenance of radio bearers. In addition, PCRF 224 and PDN GW couple to Internet protocol (IP) services 226 and network 114 which may comprise the Internet. Thus, FIG. 2 shows an embodiment of M2M system 100 as a 3GPP LTE network as one of several example broadband networks, and the scope of the claimed subject matter is not limited in this respect. An example method of altering a frequency of adjusting transmit power for random access by fixed devices in a mobile broadband network is shown in and described with respect to FIG. 3, below.

Figure 3:
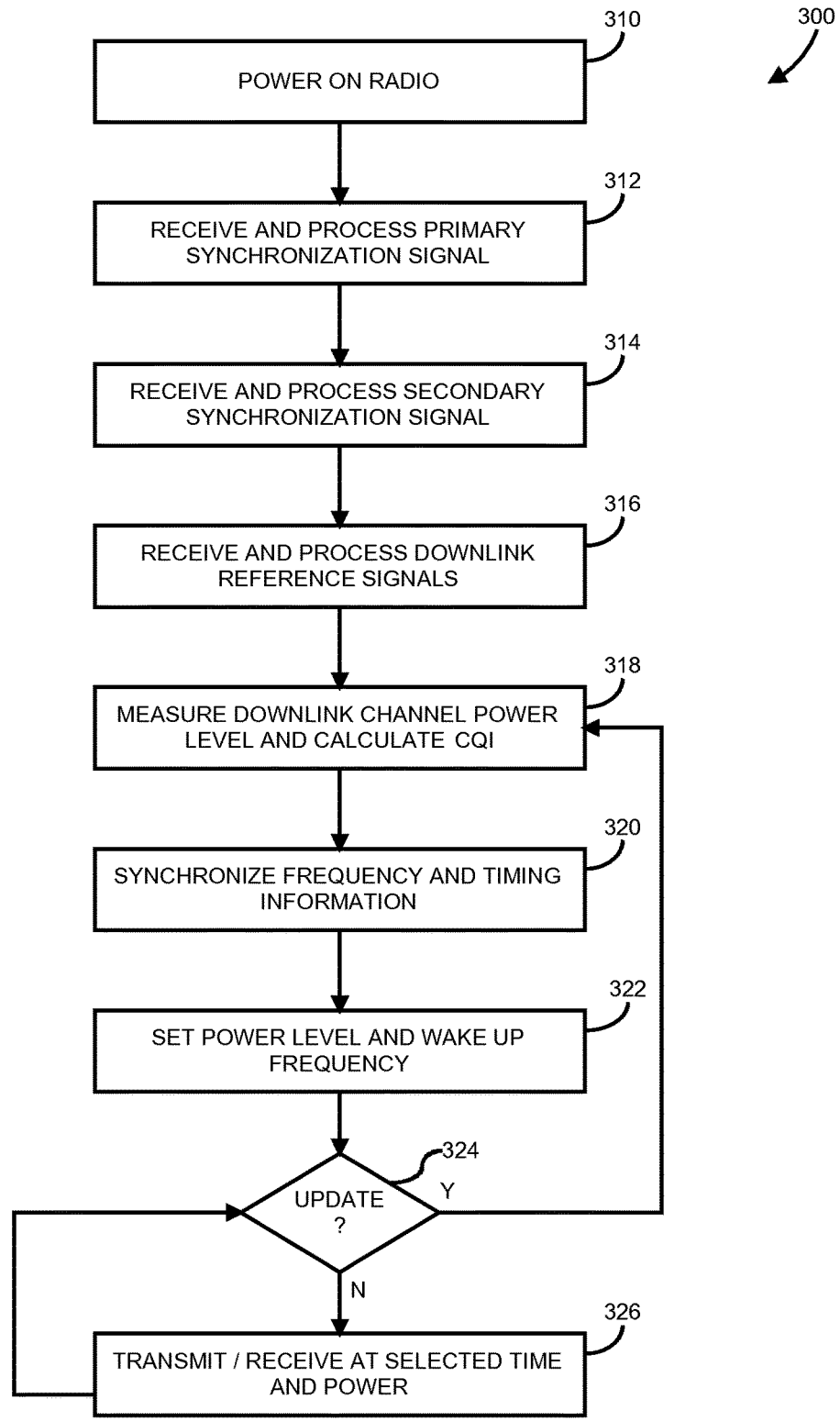
FIG. 3 is a flow diagram of a method of altering a frequency of adjusting transmit power for random access by fixed devices in a mobile broadband network in accordance with one or more embodiments.

Referring now to FIG. 3, a flow diagram of a method of altering a frequency of adjusting transmit power for random access by fixed devices in a mobile broadband network in accordance with one or more embodiments will be discussed. Method 300 illustrates one particular embodiment of a method of altering a frequency of adjusting transmit power for random access by fixed devices in a mobile broad band network. However, in one or more alternative embodiments, various other orders of the blocks of method 300 may be implemented, with more or fewer blocks, and the scope of the claimed subject matter is not limited in this respect. In general, for random access in a broadband network, the randomness comes from the received access signal power at the network receiver, the received access signal timing at the receiver, and the loading of the random access channel. The received access signal power may vary significantly with the location of the network receiver, namely the distance from the network receiver to the base transceiver station, including other shadowing effects. The received access signal timing at the receiver also may vary significantly with the position of the receiver with respect to the base transceiver station. The loading of the random access channel may be a function of any other device attempting to access the network at the same time instance or time slot, and the number of such devices. Thus, for fixed devices the randomness due to position or location may be reduced since the distance from a fixed device to the base transceiver station does not vary significantly over time if at all.

As a result, method 300 may be implemented to take advantage of such reduced randomness in the following manner. At block 310, the radio of the fixed device, for example fixed device 118 of FIG. 1, may be powered on. At block 312, the fixed device 118 may receive and process the primary synchronization signal (PSS) as part of the cell selection process, the process by which the base transceiver station 110 is identified for the purposes of initiating communication. The fixed device 118 may receive and process the secondary synchronization signal (SSS) at block 314, and downlink reference signals may be received at block 316. The fixed device 118 may then measure downlink channel power level and calculate a channel quality indicator (CQI) at block 318. At this point, in order to take advantage of reduced randomness due to being in at a fixed distance from the base transceiver station 110, the fixed device 118 may arrange for a disabled or a reduced frequency of adjusting and/or updating the transmit power level and timing information that is otherwise part of the cell search procedure for random access. The fixed device 118 synchronizes the frequency and timing information at block 320 with the base transceiver station 110. The fixed device 118 may then sent its uplink transmit power level and timing information, and the frequency at which it will wake up to transmit its data. At decision block 324, a determination may be made whether to update the uplink transmit power level and timing information, and the frequency at which it will wake up to transmit its data. If the fixed device 118 needs to update such information, the method 300 may be executed from block 318 onwards in order to make the appropriate measurements and synchronization. Otherwise, the fixed device 118 may skip such steps on wake up when it needs to transmit its data, and the fixed device 118 may transmit and/or receive at the selected time and power level without needing to measure the channel power level, update its own transmit power level, and/or to obtain synchronization information from the base transceiver station 118 since such information was previously determined. As a result, the fixed device may reduce or disable the frequency of adjusting or updating the transmit power level and timing information to a minimum level that is needed once the minimum transmit power level and timing information is determined for that fixed device. Furthermore, the fixed device 118 may not require to have a scalable transmission bandwidth wherein the fixed device 118 may negotiate with the base transceiver station 110 to utilize the minimum needed bandwidth so that the fixed device 118 will not need to perform future bandwidth determining procedures each time in the future that the fixed device 118 communicates with the base transceiver station 110. The battery power of the fixed device 118 may be conserved by disabling or reducing the frequency of making the determination and/or by updating of such parameters. However, these are merely example implementations of method 300, and the scope of the claimed subject matter is not limited in these respects.

Figure 4:
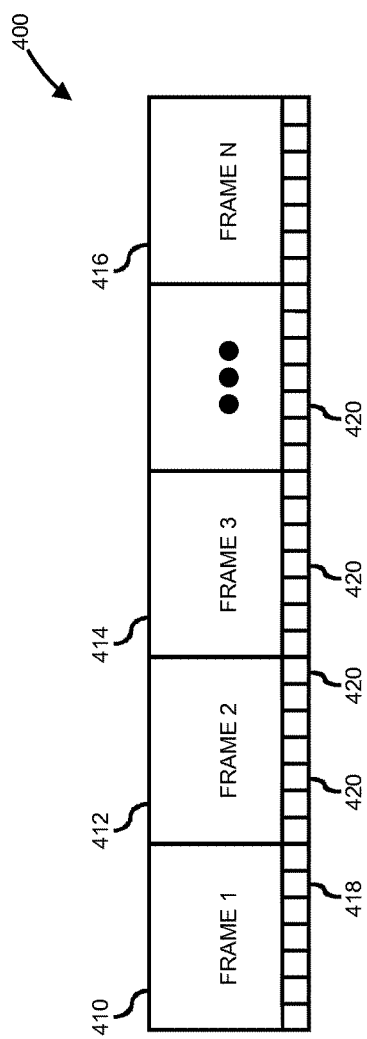
FIG. 4 is a diagram of a frame structure arranged for random access by fixed devices in a mobile broadband network in accordance with one or more embodiments.

Referring now to FIG. 4, a diagram of a frame structure arranged for random access by fixed devices in a mobile broadband network in accordance with one or more embodiments will be discussed. In the embodiment shown in FIG. 4, a frame structure 400 comprising first frame 410, a second frame 412, a third frame 414, up to an Nth frame 416, may be utilized to reduce the loading of the random access channel for fixed devices. A large number of fixed machine-to-machine (M2M) devices, for example parking meters, may not have tight latency requirements. Access for these devices may be made uniform across time to avoid and/or reduce collisions between multiple devices. Uniform distribution may be implemented by tying the selection of the random access opportunity slot with a known identifier, for example the cell radio network temporary identifier (C-RNTI). The C-RNTI is an identifier allocated by a controlling radio network controller (RNC) and is a unique identifier in each cell for user equipment (UE) such as fixed device 118 or mobile device 116. In other words, frame structure 400 may introduce restricted random access for devices that do not have delay constraints. For example, as shown in FIG. 4, a fixed device 118 may be able to access only certain slots such as slot 418 of frame 1. Other frames such as frame 412, frame 414 and frame 416 may have slots 420 for random access opportunity, for example by mobile device 116. By restricting access by fixed devices to certain slots, not allowing random access by other devices within those restricted slots, and assigning random access opportunity to other slots, the probability of collisions for fixed devices with mobile devices may be reduced. Such restriction may be based on the identifier for each of the devices such as the C-RNTI identifier wherein fixed devices are restricted to the fixed access slots, and the mobile devices are restricted to random access devices based on their respective identifiers. Furthermore, since the base transceiver station 110 knows the algorithm that ties the identifier of the devices with the fixed or random access opportunity slots, the base transceiver station 110 or eNB may enhance the detection of random access since the number of devices allowed for random access may be reduced. In one or more embodiments, the eNB may indicate to the UE which slots the UE is able utilize for random access. In some embodiments, such indication may comprise transmitting to the UE the algorithm that ties the identity of the UE to the allowed or restricted slots, for example via air-interface messages. If the algorithm is standardized, the eNB may indicate to the UE to use the standard algorithm. Such an arrangement may increase the base station and/or eNB detection probability by the UE. Furthermore, restriction of access to certain frames for fixed M2M devices that are delay tolerant may also be applied to any device that does not have delay constraints.

In one or more embodiments, if fewer devices are restricted to access a certain amount of slots, collisions may be further mitigated or eliminated by utilization of dirty-paper coding techniques or the like to assist in contention resolution within a single access attempt. Such dirty-paper coding techniques allow for transmission of data that is subject to some interference, for example during simultaneous access by other devices, by precoding the data in such a manner to reduce or eliminate the interference. Furthermore, if the fixed devices need to wake up at different time intervals rather than at the same slot every time, optimal matching assignments may be utilized to assign the devices to appropriate slots. For example, fixed devices that are located closer to the base transceiver station 110 may be grouped together, and fixed devices that are located farther away from the base transceiver station 110 may be grouped together. The devices that are grouped together may be assigned access in the same slot. It should be known that the examples shown in and described with respect to FIG. 4 are merely examples of how slot assignments and/or restrictions may be applied to fixed devices in a mobile broadband network, and the scope of the claimed subject matter is not limited in these respects.

Figure 5:
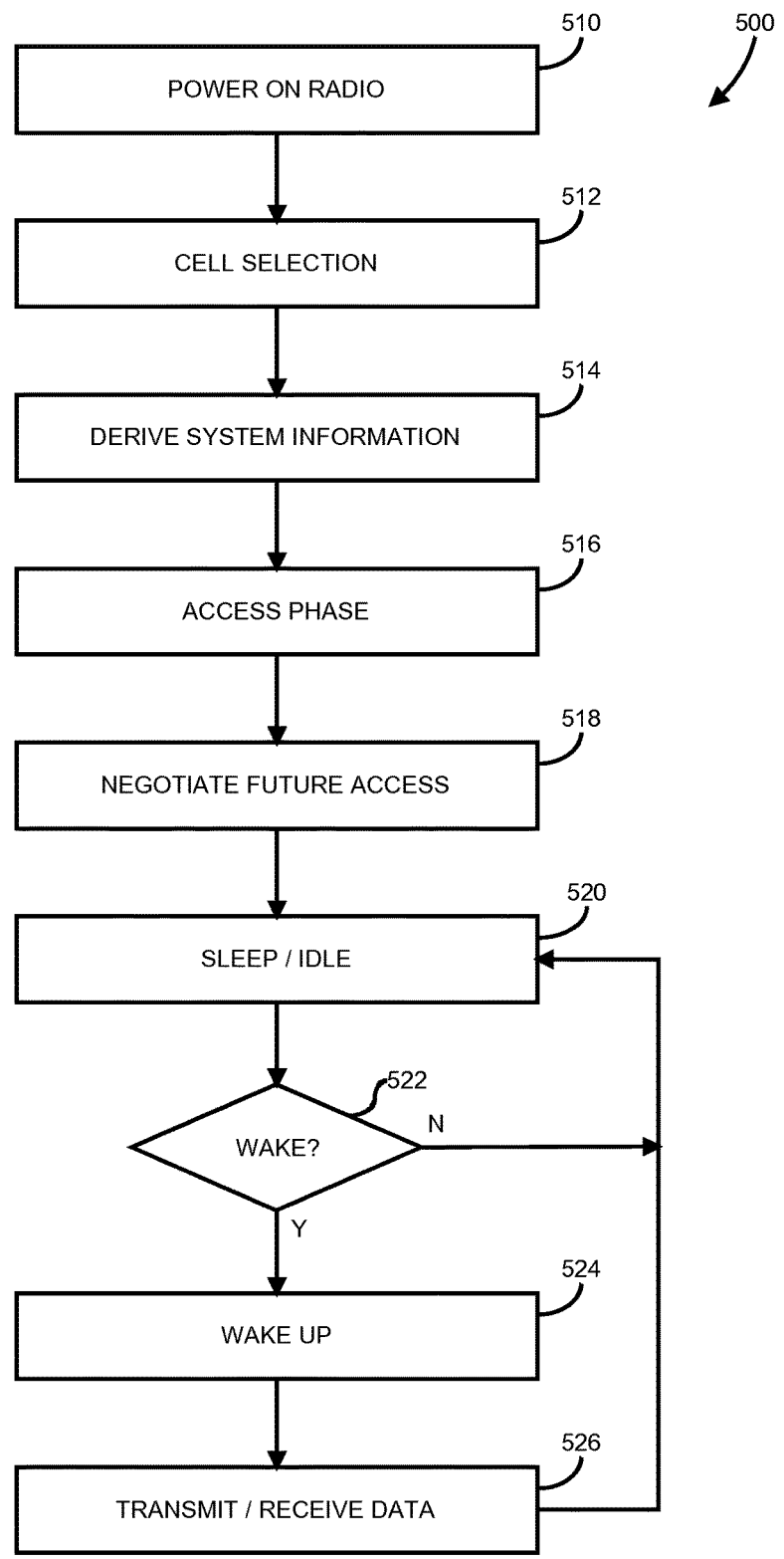
FIG. 5 is a flow diagram of an altered access phase for random access by fixed devices in a mobile broadband network in accordance with one or more embodiments.

Referring now to FIG. 5, a flow diagram of a method of an altered access phase for random access by fixed devices in a mobile broadband network in accordance with one or more embodiments will be discussed. Method 500 illustrates one particular embodiment of a method an altered access phase for random access by fixed devices in a mobile broadband network. However, in one or more alternative embodiments, various other orders of the blocks of method 500 may be implemented, with more or fewer blocks, and the scope of the claimed subject matter is not limited in this respect. In one or more embodiments, it is possible for fixed machine-to-machine (M2M) devices such as fixed device 118 to remove or skip the access phase and go directly to the transmit phase. If the wake up frequency and transmit power requirements of the fixed devices are known, and the wake up frequency is low which is expected for several types of fixed M2M devices such as a parking meter or security camera, it is possible to assign an access opportunity only for this device. In such embodiments, no other device will be permitted to access the same time slot such that access may be referred to as deterministic. As a result, the fixed device 118 may have battery power saving effects by not being required to undergo potential collision resolution and by having a reduced wake up or on time. Thus, at block 510 the radio of the fixed device 118 may be powered on, and the fixed device may perform cell selection at block 512. At block 514, the fixed device 118 may derive system information, and may perform the access phase at block 516. The fixed device 118 may then negotiate future access at block 518 with the base transceiver station 110. The fixed device 118 may then enter a sleep mode or go idle at block 520. A determination may be made at block 522 if the fixed device is ready to wake up and communicate with the base transceiver station 110 based on the previously negotiated access made at block 518. In the event it is not time for wake up, the fixed device 118 may remain in a sleep or idle mode at block 520. Otherwise, if it is time for the fixed device to wake up and communicate with base transceiver station 110, fixed device 118 may wake up at block 524, and transmit and/or receive data at block 526. After transmitting or receiving data, the fixed device 118 may then enter a sleep or idle mode at block 520 until it is again time for the fixed device 118 to wake up as determined by the negotiated wake up frequency from block 518.

In such embodiments as shown via method 500, for deterministic access there is no need to use the current random access code. Instead, a simple suitable code may be utilized. Such a simple code may identify the amount of data to be transmitted, and would allow the fixed device 118 to communicate with the base transceiver station in a fewer number of steps, for example by skipping access phase 516. Setting up a simple access code may be implemented at the negotiation block 518 wherein the fixed device 118 or user equipment (UE) and the base transceiver station 110 or enhanced Node B (eNB) may negotiate and decide on the code, the wake up frequency of the fixed device 118, the initial access time or the relationship between the initial access time and another known parameter such as frame number and/or random access opportunity ahead of time via radio resource control (RRC) signaling or other signaling messages. It should be known that the example method 500 shown in and described with respect to FIG. 5 is merely one example of an altered access phase for fixed devices in a mobile broadband network, and the scope of the claimed subject matter is not limited in this respect.

Figure 6:
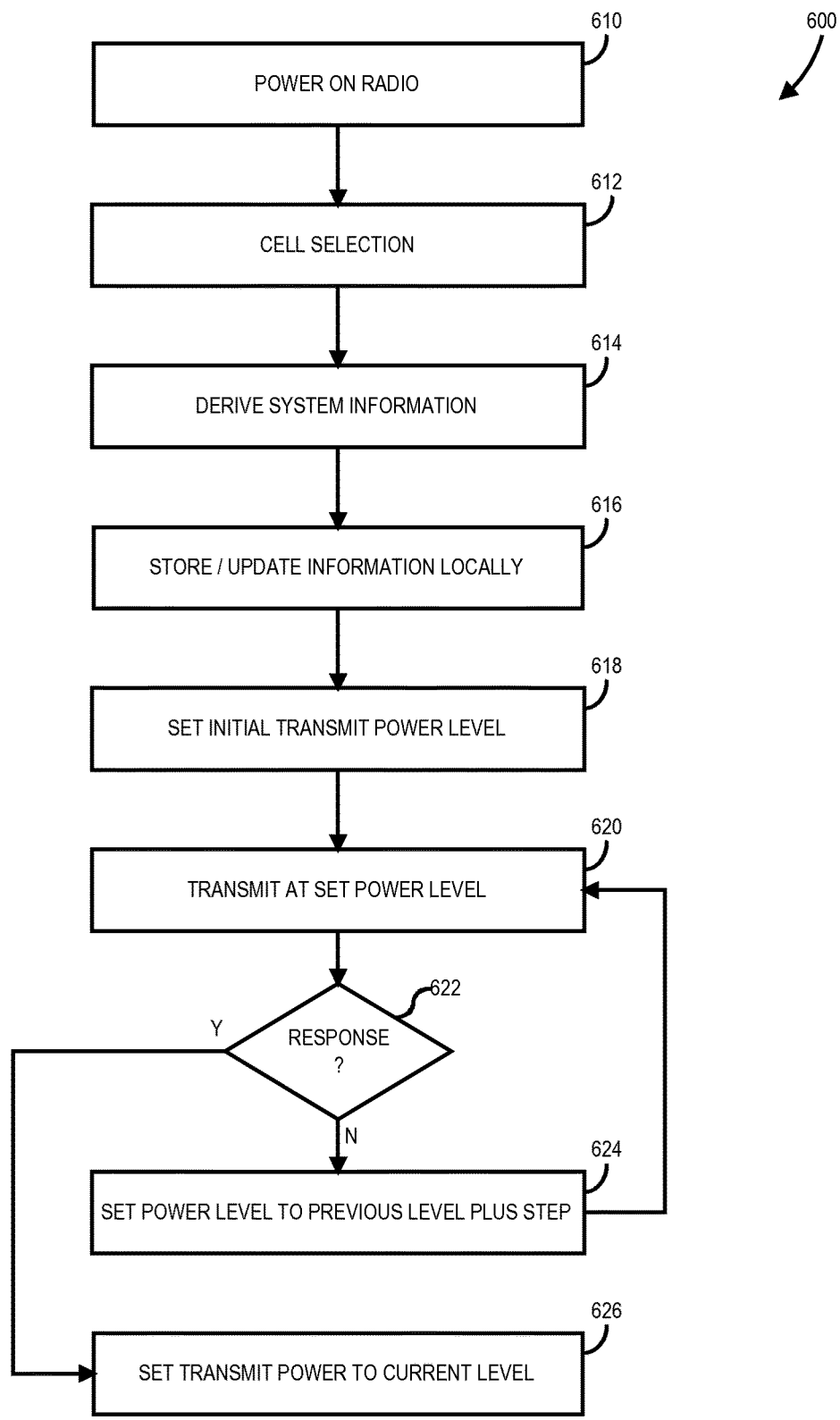
FIG. 6 is a flow diagram of a method of power estimation for random access by fixed devices in a mobile broadband network in accordance with one or more embodiments.

Referring now to FIG. 6, a flow diagram of a method of power estimation for random access by fixed devices in a mobile broadband network in accordance with one or more embodiments will be discussed. Method 600 illustrates one particular embodiment of a method of power estimation for random access by fixed devices in a mobile broadband network. However, in one or more alternative embodiments, various other orders of the blocks of method 600 may be implemented, with more or fewer blocks, and the scope of the claimed subject matter is not limited in this respect. In a Long Term Evolution (LTE) system, the user equipment (UE) estimates the minimum amount of power it needs to send without causing excessive interference with other devices on the system. The UE sets the initial transmit power to:

$$\min(P_{max}, \text{Preamble Initial Received Target Power} + PL)$$

where $P_{max}$ is the maximum transmission power, PL is the estimate of the uplink path loss, and Preamble Initial Received Target Power is the power level that the enhanced Node B (eNB) would like to receive for random access. However, it may be challenging for the UE to estimate the uplink path loss (PL) accurately. As a result, it may take additional time for the UE to determine an optimal transmission power. In general, a fixed UE such as fixed device 118 of FIG. 1 will store and update the following information locally.

1.) Cell Identification (ID)
2.) Uplink Frequency
3.) Preamble Initial Received Target Power ($P_1$) of last access
4.) Transmission Power ($P_0$) of last access Both the Cell ID and the Uplink Frequency are used to uniquely identify an eNB with which the fixed UE wants to connect. The initial value of $P_0$ will be set to a very small value, for example −104 dBm, and the initial value of P1 will be set to a value of zero.

In accordance with one or more embodiments, when a fixed UE such as fixed device 118 tries to connect to base transceiver station 110, in order to perform a less involved approach to estimate uplink transmit power, the fixed device UE will utilize the following modified equation to determine its initial transmit power:

$$\min(P_{max}, \max(\text{Preamble Initial Received Target Power} + PL, P_0 + (\text{Preamble Initial Received Target Power} - P_1))$$

Thus, according to method 600, at block 610 the fixed device 118 may power its radio on, and may perform cell selection 612 at block 612. The fixed device 118 may then derive system information at block 614, and more store and update network information locally at block 616. At block 618, the fixed device 118 may set an initial transmit power level according to the modified power equation, above, and then may transmit at the set initial power level at block 620. A determination may be made at decision block 622 if the fixed device 118 receives any response from the base transceiver station 110 or eNB. If the base transceiver station 110 fails to respond to the random access transmission by the fixed device 118 as determined at decision block 622 in a designated time window, for example a Random Access Response Window Size, the fixed device 118 may repeat method 600 at block 624 by setting the transmit power level to a value of the previous transmit power level plus an increase in power by a Power Ramping Step value, and continue the method 400 at block 620 until a response is received. If a response from the base transceiver station 110 or eNB is received, then the fixed device 118 may set the transmit power $P_0$ to the current power level and $P_1$ accordingly at block 626 which will be the power level to be used by the fixed device for future transmissions. It should be known that the example method 600 shown in and described with respect to FIG. 6 is merely one example of a method of power estimation for fixed devices in a mobile broadband network, and the scope of the claimed subject matter is not limited in this respect.

Figure 7:
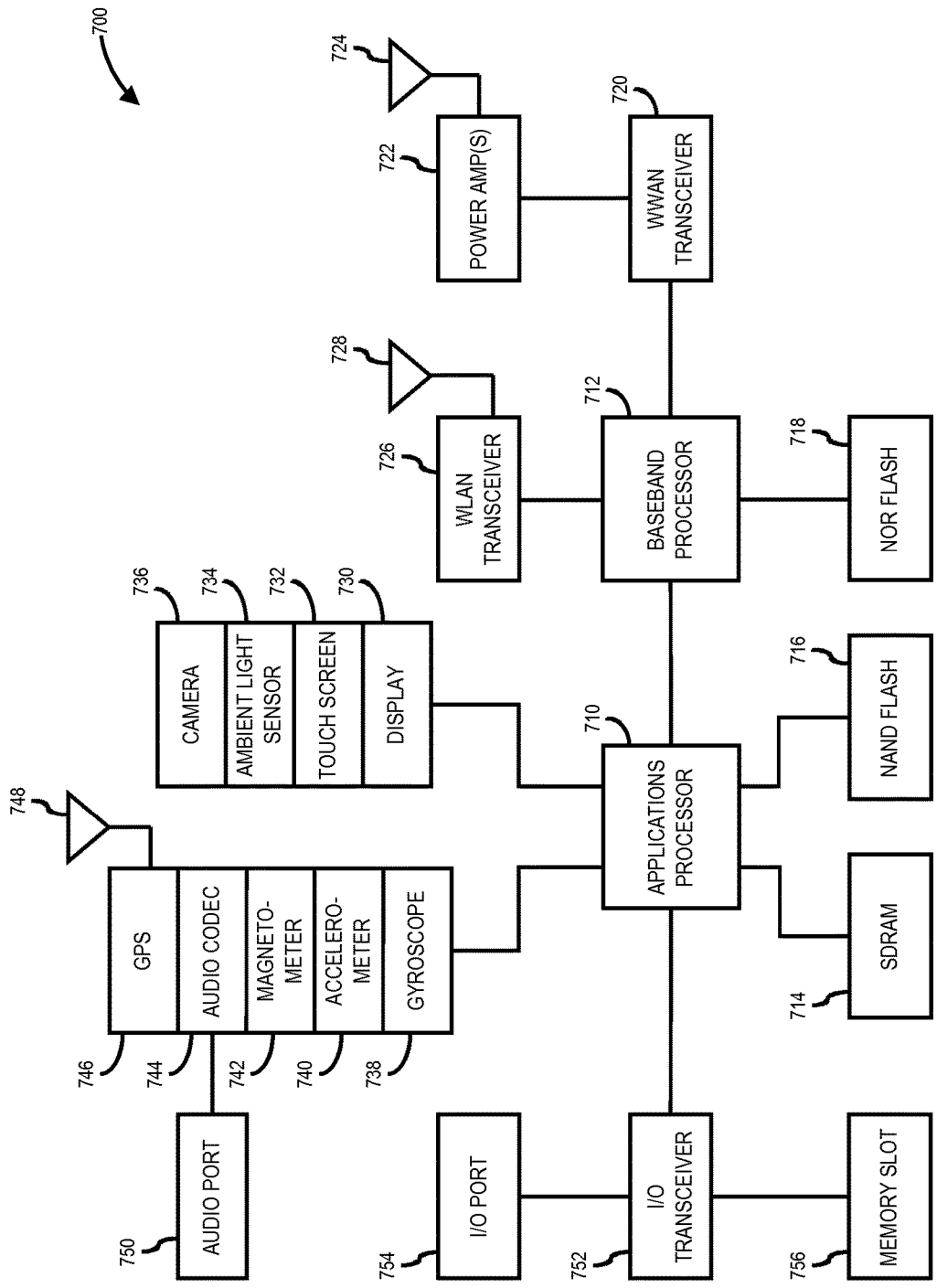
FIG. 7 is a block diagram of an information handling system capable of implanting random access for a fixed device in a mobile broadband network in accordance with one or more embodiments.

Referring now to FIG. 7, a block diagram of an information handling system capable of implanting random access for a fixed device in a mobile broadband network in accordance with one or more embodiments will be discussed. Information handling system 700 of FIG. 7 may tangibly embody one or more of any of the network elements or devices of the machine-to-machine system 100 as shown in and described with respect to FIG. 1. For example, information handling system 700 may represent the hardware of fixed device 118, mobile device 116 and/or base transceiver station 110, with greater or fewer components depending on the hardware specifications of the particular device or network element. Although information handling system 700 represents one example of several types of computing platforms, information handling system 700 may include more or fewer elements and/or different arrangements of elements than shown in FIG. 7, and the scope of the claimed subject matter is not limited in these respects.

In one or more embodiments, information handling system 700 may include an applications processor 710 and a baseband processor. Applications processor 710 may be utilized as a general purpose processor to run applications and the various subsystems for information handling system 700. Applications processor 710 may include a single core or alternatively may include multiple processing cores wherein one or more of the cores may comprise a digital signal processor or digital signal processing core. Furthermore, applications processor 710 may include a graphics processor or coprocessor disposed on the same chip, or alternatively a graphics processor coupled to applications processor 710 may comprise a separate, discrete graphics chip. Applications processor 710 may include on board memory such as cache memory, and further may be coupled to external memory devices such as synchronous dynamic random access memory (SDRAM) 714 for storing and/or executing applications during operation, and NAND flash 716 for storing applications and/or data even when information handling system 700 is powered off. Baseband processor 712 may control the broadband radio functions for information handling system 700. Broadband processor 712 may store code for controlling such broadband radio functions in a NOR flash 718. Baseband processor 712 controls a wireless wide area network (WWAN) transceiver 722 which is used for modulating and/or demodulating broadband network signals, for example for communicating via a 3GPP LTE network or the like as discussed herein with respect to FIG. 2. The WWAN transceiver 720 couples to one or more power amps 722 respectively coupled to one or more antennas 724 for sending and receiving radio-frequency signals via the WWAN broadband network. The baseband processor 712 also may control a wireless local area network (WLAN) transceiver 726 coupled to one or more suitable antennas 728 and which may be capable of communicating via a Wi-Fi, Bluetooth, and/or an amplitude modulation (AM) or frequency modulation (FM) radio standard including an IEEE 802.11 a/b/g/n standard or the like. It should be noted that these are merely example implementations for applications processor 710 and baseband processor 712, and the scope of the claimed subject matter is not limited in these respects. For example, any one or more of SDRAM 714, NAND flash 716 and/or NOR flash 718 may comprise other types of memory technology such as magnetic memory, chalcogenide memory, phase change memory, or ovonic memory, and the scope of the claimed subject matter is not limited in this respect. Applications processor 710, baseband processor 712, SDRAM 714, NAND flash 716, and/or NOR flash 718 may include and/or comprise an article of manufacture comprising a storage medium or one or more storage media having instructions stored thereon that, if executed by a processor such as applications processor 710 and/or baseband processor 712, result in one or more operations of the subject matter disclosed herein.

In one or more embodiments, applications processor 710 may drive a display 730 for displaying various information or data, and may further receive touch input from a user via a touch screen 732 for example via a finger or a stylus. An ambient light sensor 734 may be utilized to detect an amount of ambient light in which information handling system 700 is operating, for example to control a brightness or contrast value for display 730 as a function of the intensity of ambient light detected by ambient light sensor 734. One or more cameras 736 may be utilized to capture images that are processed by applications processor 710 and/or at least temporarily stored in NAND flash 716. Furthermore, applications processor may couple to a gyroscope 738, accelerometer 740, magnetometer 742, audio coder/decoder (CODEC) 744, and/or global positioning system (GPS) controller 746 coupled to an appropriate GPS antenna 748, for detection of various environmental properties including location, movement, and/or orientation of information handling system 700. Audio CODEC 744 may be coupled to one or more audio ports 750 to provide microphone input and speaker outputs either via internal devices and/or via external devices coupled to information handling system via the audio ports 750, for example via a headphone and microphone jack. In addition, applications processor 710 may couple to one or more input/output (I/O) transceivers 752 to couple to one or more I/O ports 754 such as a universal serial bus (USB) port, a high-definition multimedia interface (HDMI) port, a serial port, and so on. Furthermore, one or more of the I/O transceivers 752 may couple to one or more memory slots 756 for optional removable memory such as secure digital (SD) card or a subscriber identity module (SIM) card, although the scope of the claimed subject matter is not limited in these respects.

Figure 8:
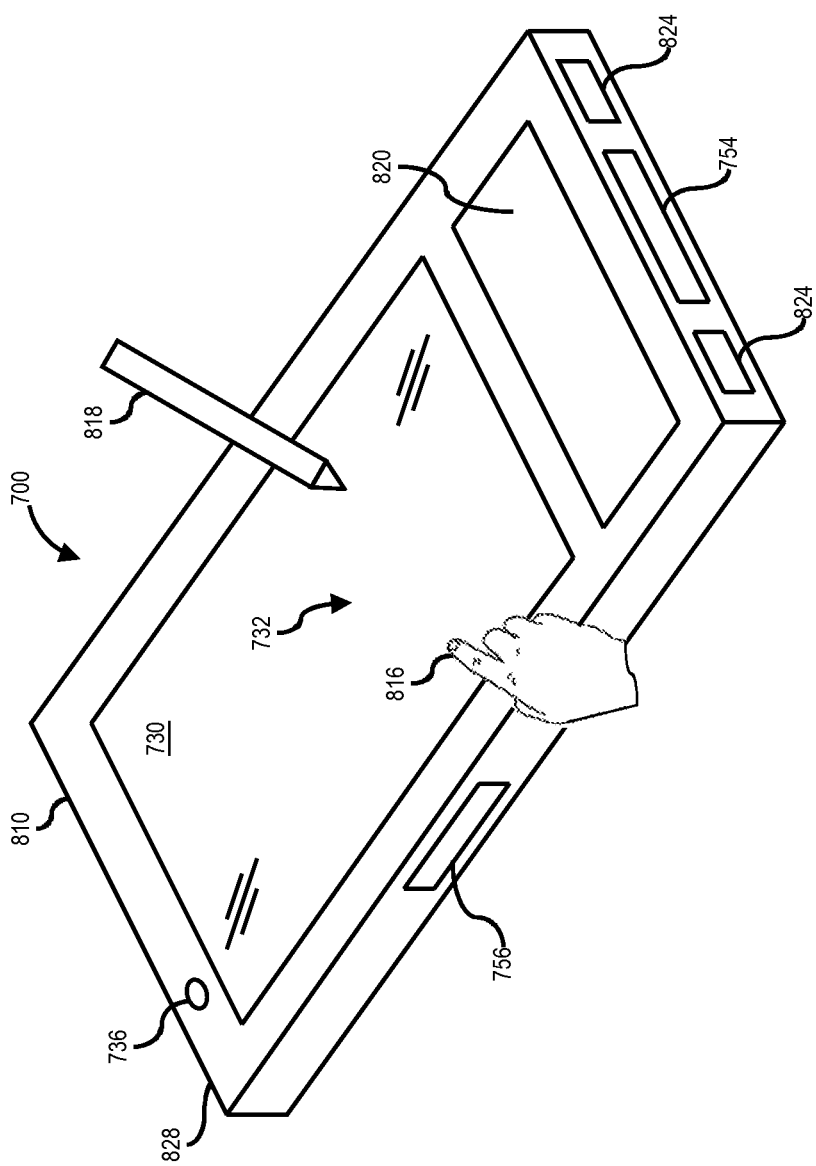
FIG. 8 is an isometric view of an information handling system of FIG. 7 that optionally may include a touch screen in accordance with one or more embodiments.

Referring now to FIG. 8, an isometric view of an information handling system of FIG. 7 that optionally may include a touch screen in accordance with one or more embodiments will be discussed. FIG. 8 shows an example implementation of information handling system 700 of FIG. 7 tangibly embodied as a cellular telephone, smartphone, or tablet type device or the like. In one or more embodiments, the information handling system 700 may comprise fixed device 118 or mobile device 116 of FIG. 1, although the scope of the claimed subject matter is not limited in this respect. The information handling system 700 may comprise a housing 810 having a display 730 which may include a touch screen 732 for receiving tactile input control and commands via a finger 816 of a user and/or a via stylus 818 to control one or more applications processors 710. The housing 810 may house one or more components of information handling system 700, for example one or more applications processors 710, one or more of SDRAM 714, NAND flash 716, NOR flash 718, baseband processor 712, and/or WWAN transceiver 720. The information handling system 700 further may optionally include a physical actuator area 820 which may comprise a keyboard or buttons for controlling information handling system via one or more buttons or switches. The information handling system 700 may also include a memory port or slot 756 for receiving non-volatile memory such as flash memory, for example in the form of a secure digital (SD) card or a subscriber identity module (SIM) card. Optionally, the information handling system 700 may further include one or more speakers and/or microphones 824 and a connection port 754 for connecting the information handling system 700 to another electronic device, dock, display, battery charger, and so on. In addition, information handling system 700 may include a headphone or speaker jack 828 and one or more cameras 736 on one or more sides of the housing 810. It should be noted that the information handling system 700 of FIG. 8 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to random access techniques for fixed devices in mobile broadband networks and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a user equipment (UE), comprising:
one or more baseband processors to cause a cell search to be performed to search for one or more cells on a network, and to determine a transmit power level to communicate with one of the cells of the network; and
a memory to store a frequency of updating the transmit power level for communication with the cell on the network;
wherein the UE is a fixed device, and wherein the frequency of updating the transmit power level is reduced for the UE as a fixed device with respect to a mobile device; and
wherein the one or more baseband processors are to disable updating the transmit power level such that the frequency of updating the transmit power level is reduced to zero for the UE as a fixed device.

2. The apparatus of claim 1, wherein the one or more baseband processors are to synchronize frequency and timing information with cell, and to set a frequency of updating the frequency and timing information for communication with the cell, wherein the frequency of updating the frequency and timing information is reduced for the UE as a fixed device with respect to a mobile device.

3. The apparatus of claim 2, wherein the one or more baseband processors are to:
determine if the frequency and timing information should be updated, and if so then execute said synchronizing frequency and timing information to determine an updated frequency and timing information; and
otherwise cause the UE to operate using a present frequency and timing information.

4. The apparatus of claim 2, wherein the one or more baseband processors are to disable updating the frequency and timing information such that the frequency of updating the frequency and timing information is reduced to zero for the UE as a fixed device.

5. The apparatus of claim 1, wherein the one or more baseband processors are to process a primary synchronization signal, a secondary synchronization signal, or a downlink reference signal, or a combination thereof.

6. The apparatus of claim 1, wherein the one or more baseband processors are to measure a downlink channel power level and to calculate a channel quality indicator.

7. The apparatus of claim 1, wherein the one or more baseband processors are to determine if the transmit power level should be updated, and if so then to determine a transmit power level to determine an updated transmit power level, or otherwise to transmit at a present transmit power level.

8. An apparatus of an evolved Node B (eNB), comprising:
one or more baseband processors to identify a device on a network to determine an identity of the device, determine if the device is a fixed device based at least in part one the identity of the device, and
a memory to store the identity of the device;
wherein if the device is a fixed device, the one or more baseband processors are to restrict access by the device to one or more slots designated for fixed access by generating an indication to the device which slots the device may access.

9. The apparatus of claim 8, wherein the one or more baseband processors are to determine the identity of the device based at least in part on an identifier (ID) of the device.

10. The apparatus of claim 8, wherein the one or more baseband processors are to transmit an algorithm to the device from which the device may determine which one or more of the slots are available to the device for random access based at least in part on the identity of the device.

11. The apparatus of claim 8, wherein the one or more baseband processors are to determine the identity of the device based at least in part on a cell radio network temporary identifier (C-RNTI).

12. The apparatus of claim 8, wherein the one or more baseband processors are to restrict non-fixed to devices to one or more other slots designated for random access.

13. The apparatus of claim 8, wherein the one or more baseband processors are to resolve contention at one of the designated slots with dirty-paper coding.

14. The apparatus of claim 8, wherein the one or more baseband processors are to resolve contention at one of the designated slots by grouping devices to access a given slot based at least in part on a distance of the devices from a base transceiver station, wherein devices closer to the base transceiver station are assigned access to a first slot, and devices farther away from the base transceiver station are assigned to access a second slot.

15. An apparatus of a user equipment (UE), comprising:
one or more baseband processors to perform a cell search to search for one or more cells on a network, access one of the cells of the network during an access phase, and negotiate future access with the cell; and
a memory to store the negotiated future access with the cell;
wherein the one or more baseband processors are to encode data to be transmitted at the negotiated future access.

16. The apparatus of claim 15, wherein the one or more baseband processors are to determine a slot at which no other device will be allowed to access the cell.

17. The apparatus of claim 15, wherein the one or more baseband processors are to encode data at the negotiated future access without requiring further execution of an access phase.

18. The apparatus of claim 15, wherein the one or more baseband processors are to cause the UE to enter a sleep or an idle mode until a time of the future access with the cell.

19. The apparatus of claim 15, wherein the one or more baseband processors are to cause the UE to enter a sleep or an idle mode until a time of the future access with the cell, wake from the sleep or idle mode at the time of future access, and cause the data to be transmitted after the UE is wakened.

* * * * *